United States Patent
Perkins et al.

(10) Patent No.: US 10,042,935 B1
(45) Date of Patent: Aug. 7, 2018

(54) SYSTEMS AND METHODS OF MATCHING STYLE ATTRIBUTES

(71) Applicant: CANVA PTY LTD., Sydney (AU)

(72) Inventors: Melanie Joy Perkins, Sydney (AU); Michael Hebron, Sydney (AU); Robert Hazlewood, Sydney (AU)

(73) Assignee: CANVA PTY LTD., Sydney (AU)

( * ) Notice: Subject to any disclaimer, the term of this patent is extended or adjusted under 35 U.S.C. 154(b) by 0 days.

(21) Appl. No.: 15/499,698

(22) Filed: Apr. 27, 2017

(51) Int. Cl.
*G06F 17/30* (2006.01)
*G06N 3/08* (2006.01)

(52) U.S. Cl.
CPC .. *G06F 17/30864* (2013.01); *G06F 17/30244* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 8,352,494 B1* | 1/2013 | Badoiu | ............ | G06F 17/30256 382/224 |
| 8,661,012 B1* | 2/2014 | Baker | ............ | G06F 17/30 707/705 |
| 2004/0261017 A1* | 12/2004 | Perry | ............ | G06F 17/30893 715/205 |
| 2010/0158412 A1* | 6/2010 | Wang | ............ | G06F 17/3025 382/305 |
| 2014/0026038 A1* | 1/2014 | Lee | ............ | G11B 27/28 715/244 |

OTHER PUBLICATIONS

"A smarter icon library," illustrio, <https://illustrio.com/?q=cat&page=1>, retrieved Apr. 27, 2017, 1 page.
"How to use TinEye," TinEye, <https://tineye.com/how> retrieved Apr. 26, 2017, 2 pages.
"What is CSS?," Cascading Style Sheets, <https://www.w3.org/Style/CSS/Overview.en.html> retrieved Apr. 26, 2017, 2 pages.
Garces, E. et al. "A Similarity Measure for Illustration Style," ACM Transactions on Graphics (TOG)—Proceedings of ACM SIGGRAPH 2014, vol. 33, Issue 4, Jul. 2014, 9 pages.

(Continued)

*Primary Examiner* — Alex Gofman
(74) *Attorney, Agent, or Firm* — Toler Law Group, PC

(57) ABSTRACT

A method includes receiving, at a processor of a computing device, a first search query during editing of a design, the first search query including at least a first search term. The method also includes identifying at least one style attribute associated with the design and searching at least one database based on the first search term, the at least one style attribute, or a combination thereof, to generate search results. The method further includes outputting the search results. A first search result of the search results is ranked higher than a second search result of the search results based on a determination that the first search result more closely matches the at least one style attribute associated with the design than the second search result.

18 Claims, 9 Drawing Sheets

(56) References Cited

OTHER PUBLICATIONS

Lachance, N. "Facebook's Facial Recognition Software Is Different From the FBI's. Here's Why," npr, <http://www.npr.org/sections/alltechconsidered/2016/05/18/477819617/facebooks-facial-recognition-software-is-different-from-the-fbis-heres-why>, May 18, 2016, 10 pages.
Vollick, Ian, et al., "Specifying Label Layout Styles by Example," UIST 2007, Oct. 2017, University of California, Berkley, 10 pages.
Ying, Cao, et al., "Automatic Stylistic Manga Layout," ACM Trans. on Graphics (Proc. SIGGRAPH Asia 2012), Nov. 2012, vol. 31, Issue 6, ACM, New York, New York, 10 pages.

* cited by examiner

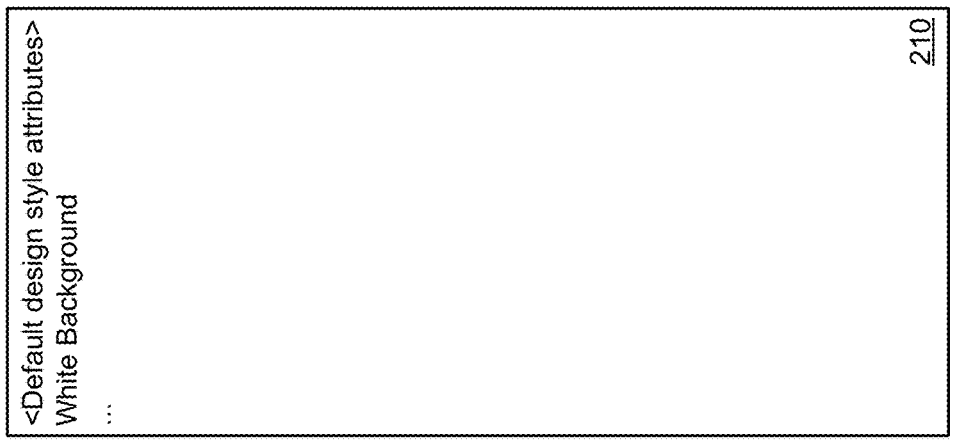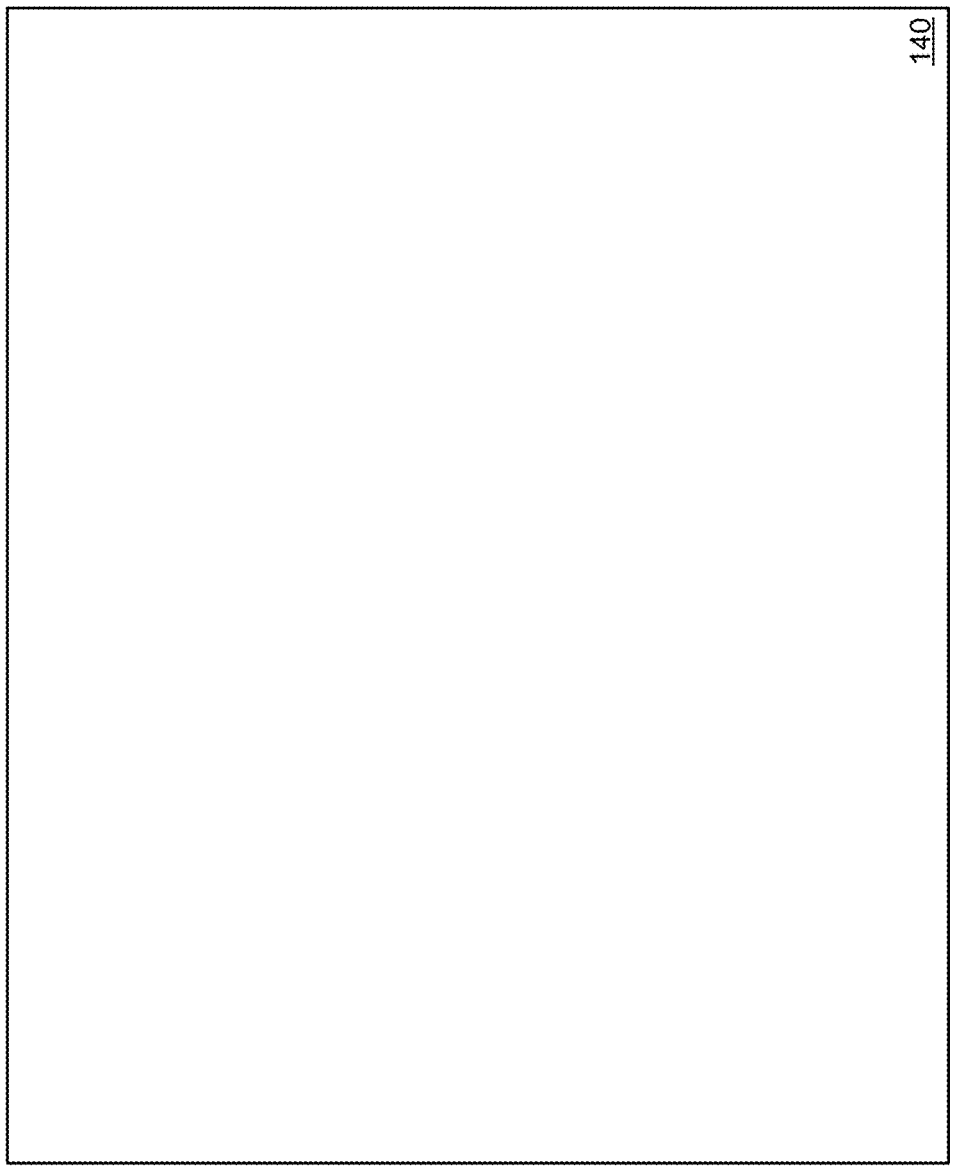
FIG. 2

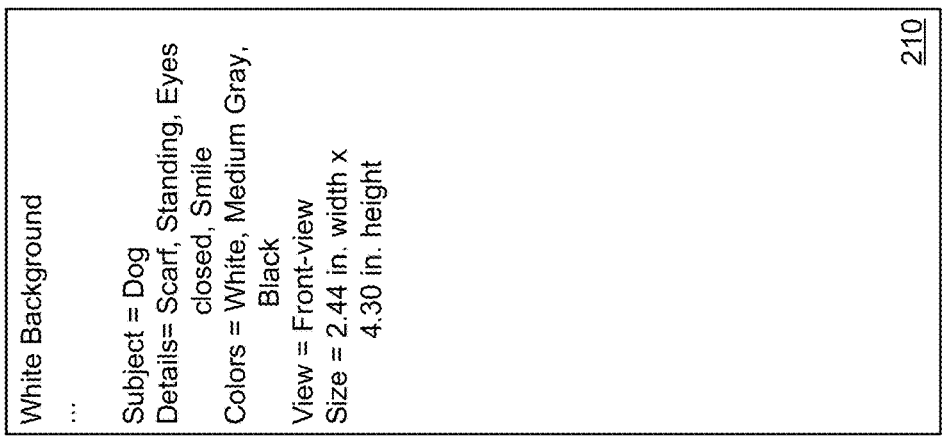
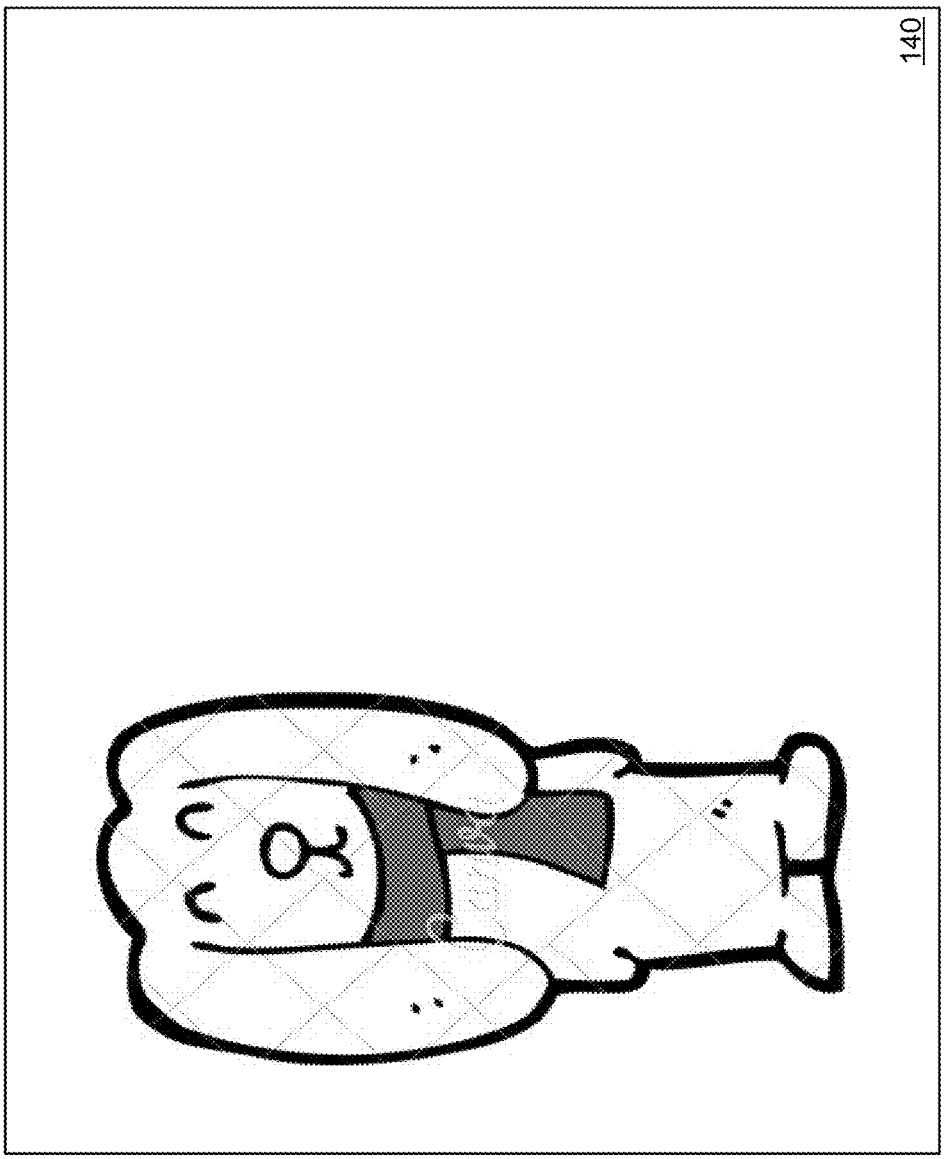
FIG. 3

First Search Query (user input): cat

Second (augmented) Search Query:
subject = cat;
details = scarf, standing, eyes closed, smile;
colors = white, medium gray, black;
view = front-view;
size = 2.44x4.30

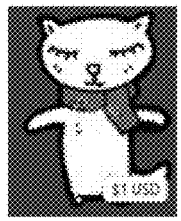

Subject = *Cat*
Details = *Scarf*, *Standing*,
　　　　　*Eyes closed*, *Smile*
Colors = *White*, *Black*,
　　　　　*Medium Gray*
View = *Front-view*
Size = 3.49 in. width x
　　　　4.30 in. height 8 Style Attributes Match 2nd Search Query

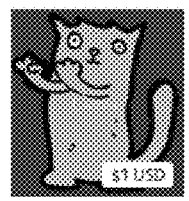

Subject = *Cat*
Details = Eyes open, Boxing,
　　　　　Fists, Tail Up,
　　　　　*Standing*
Colors = Yellow, *Black*
View = Diagonal
Size = 1.03 in. width x
　　　　1.12 in. height 3 Style Attributes Match 2nd Search Query

First Search Query (user input): cat

Second (augmented) Search Query:

Hash of search query = H3 $\begin{cases} \text{subject = cat;} \\ \text{details = scarf, standing, eyes closed, smile;} \\ \text{colors = white, medium gray, black;} \\ \text{view = front-view;} \\ \text{size = 2.44x4.30} \end{cases}$

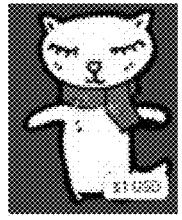

Subject = *Cat*
Details = *Scarf, Standing,
         Eyes closed, Smile*
Colors = *White, Black,
         Medium Gray*
View = *Front-view*
Size = *3.49 in. width x
       4.30 in. height*

Hash of search result = H1

Subject = *Cat*
Details = *Eyes open, Boxing,
         Fists, Tail Up,
         Standing*
Colors = *Yellow, Black*
View = *Diagonal*
Size = *1.03 in. width x
       1.12 in. height*

Hash of search result = H2

• • •

|H1-H3| < |H2-H3|

*FIG. 6*

SYSTEMS AND METHODS OF MATCHING STYLE ATTRIBUTES

BACKGROUND

Due to the increasing popularity and availability of the Internet, users have access to far more media content than before. This has resulted in large stock image databases that are available to users, so that the users can choose stock images to use in their own graphic designs. However, because such databases can be large (e.g., include hundreds of millions of images, or more) it may be difficult and time consuming for a user to search the databases to find search results (e.g., images) that are of interest. Consequently, users are spending an increasing amount of time searching and browsing online databases to identify images that are of interest (e.g., suitable for use in a particular graphical design).

BRIEF DESCRIPTION OF THE DRAWINGS

FIG. 2 illustrates a first particular example of style attributes associated with a design;

FIG. 3 illustrates a second particular example of style attributes associated with a design;

FIG. 5 illustrates a particular example of a method of matching style attributes of a design and style attributes of search results to identify search results of interest;

FIG. 6 illustrates another particular example of a method of matching style attributes;

DETAILED DESCRIPTION

Figure 1:
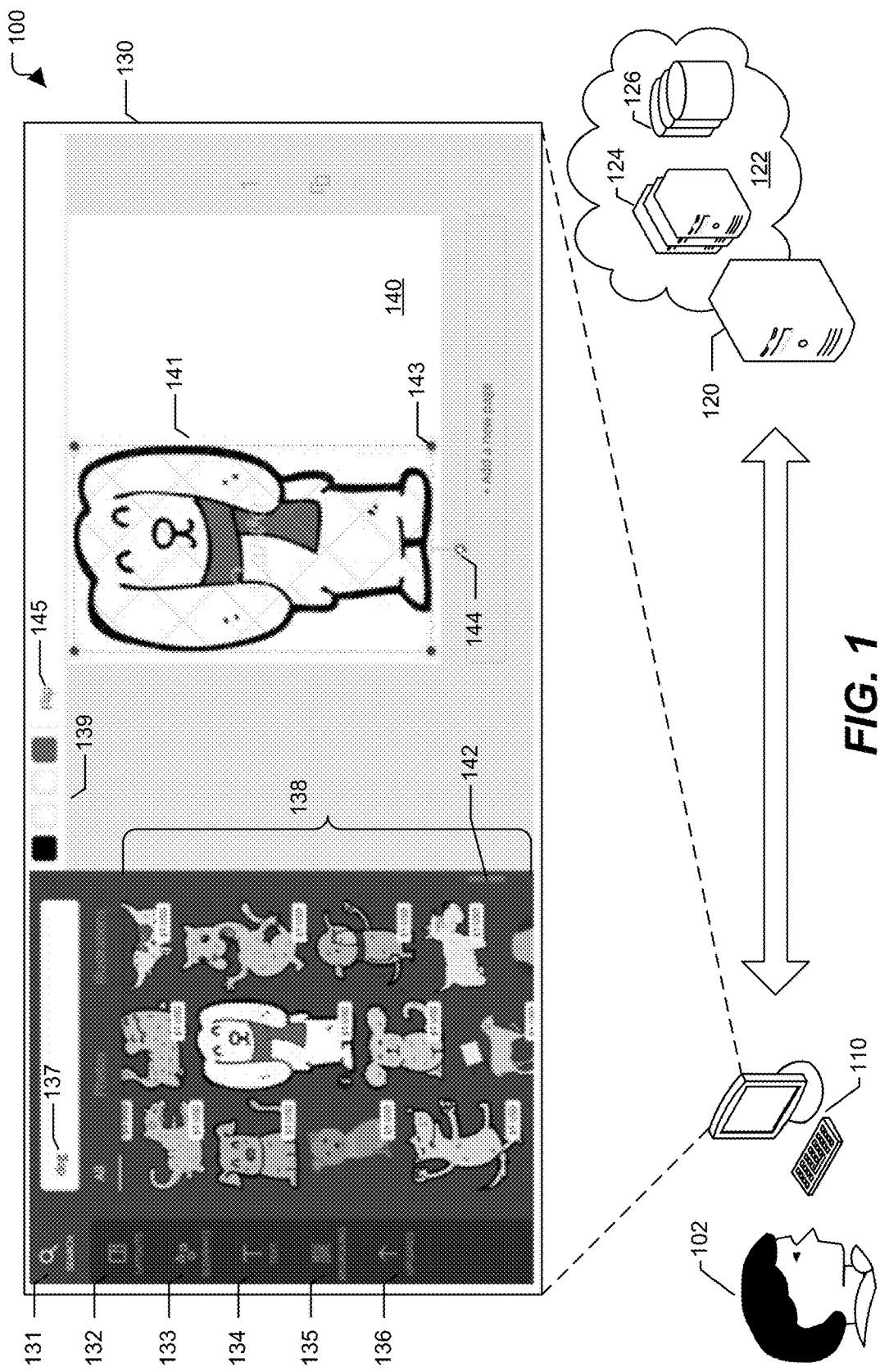
FIG. 1 illustrates a particular example of a system that is operable to match style attributes of a design to style attributes of search results to identify search results of interest.

Systems and methods of matching style attributes are disclosed. As used herein a "style attribute" may describe a visual aspect of a computerized design. A style attribute may alternately be referred to as a "style vector." As used herein, a "design" may include image content (e.g., in vector format or pixel format), text content, formatting information (e.g., colors, fonts, etc.), etc. To illustrate, if a design includes a black background and a photo of a white sports car in the foreground, the style attributes for that design may include "black," "white," "sports car," "monochrome," etc., as illustrative non-limiting examples. In some aspects, style attributes may include non-visual keywords associated with items in the design (e.g., the style attributes for the design including the sports car may include "fast"). In accordance with the described techniques, when a user (who may not be a graphic designer or other visual arts professional) performs a computerized search for media content to add to the design, search results may be presented to the user such that images with style attributes that generally match the style attributes of the design are ranked higher. To illustrate, if the user searches for an image of a motorcycle to add to the design that includes the white sports car on a black background, then images of white motorcycles may be ranked higher than images of motorcycles in other colors. Alternatively, or in addition, images of sport bike-type motorcycles may be ranked higher than images of cruiser-type or scooter-type motorcycles. Although various descriptions herein may refer to an "image" search, it is to be understood that the techniques of the present disclosure may be used with various media types, including but not limited to images, fonts, and other types of visual media content.

In particular aspects, matching of style attributes may be performed using a "style document" that is created and maintained for a design, where the style document includes style attributes of the design. The style document may be automatically updated as the user modifies the design, such as when the user adds an item to the design, removes an item from the design, or edits an item in the design. The style document may be stored (e.g., in a cloud server or data storage device) as part of the design or may be stored separately from the design. In such aspects, when the user performs an image search for "motorcycle," all or a portion of the style document may be appended to the search query, so that the style attributes in the style document can be compared to the style attributes of the search results.

It will be appreciated that automatic matching of style attributes as described herein may enable faster design processes and a more intuitive user experience. For example, when search results that match the style attributes of an in-progress design are prioritized, a user may be able to find relevant images, fonts, layouts, etc. faster (e.g., the user may not have to scroll through a large number of search results before finding an image of a white sports bike-type motorcycle). Additional illustrative, non-limiting advantages of the present disclosure are described herein.

In the following description, embodiments of the present disclosure are described in conjunction with a graphic design website that enables users to create designs using web application(s) or other Software-as-a-service (SaaS) components. Examples of graphic designs include, but are not limited to, social media posts or headers, presentations, letterheads, magazine layouts, certificates, resumes, flyers, book/album covers or art, infographics, flyers, posters, menus, business cards, brochures, logos, greeting cards, postcards, invitations, collages, announcements, blog graphics, Internet advertisements, videos, animations, etc. In some examples, the website can be accessed by using Internet browsers and/or an application installed on a mobile device, such as a mobile phone or tablet. Unless specified otherwise, reference to the "website" herein includes the graphic design web application(s)/SaaS component(s) accessible via the website. Use of the website to create designs may be faster and/or more convenient than using a standalone downloaded/purchased software program. However, it is to be understood that the description of website-based embodiments herein is for illustration only and is not to be considered limiting. In alternative implementations, the techniques of the present disclosure may be applied in the context of a standalone computer application executed on a desktop computer, a laptop computer, a mobile device, etc.

When a user creates a new design on the website, the user may start with a blank design or may start from a design template that has a pre-applied layout. As used herein, a "layout" includes a default template of images, colors, and/or fonts. For example, the graphic design website may provide access to several "holiday greeting card" layouts, and a user may select one of the layouts as a starting point from which to customize their own holiday greeting card by uploading photos of their own family, entering a personalized greeting message, changing the images/fonts/colors included in the pre-applied layout, etc.

To provide a more comprehensive design experience, the website may enable the user to search for images, layouts, fonts, etc., as described above. To illustrate, the user may enter the search term "dog" to search for stock images of dogs that can be inserted into a design, pre-existing layouts featuring images and/or text about dogs, previously stored designs (by that user or by other users) featuring dogs, or any combination thereof. Incorporating a search result image (e.g., a photo of a dog) into a design may be as simple as "dragging-and-dropping" the image into the design, at which point the user may be free to edit the image in terms of size, color, etc. Certain media assets (e.g., images, layouts, fonts, etc.) may be free to incorporate into designs while others may be available for a price and may have an associated license (e.g., a one-time-use license) that is enforced by the website.

An illustrative example of system that supports operation of such as website and that is operable to match of style attributes, is shown in FIG. 1 and generally designated 100. The system 100 includes a computing device 110 that is communicably coupled to a server 120. The computing device 110 is configured to be operated by a user 102. As further described herein, the system 100 may enable the user 102 to quickly and easily create and edit various forms of graphic designs and other visual media works, even if the user 102 is not a trained graphic designer or other visual arts professional. In some examples, the server 120 is included in a network-accessible cloud computing environment 122 that includes one or more other servers 124 and/or one or more databases, data stores, and/or data storage devices 126.

In particular aspects, the computing device 110 corresponds to a desktop computer, laptop computer, mobile phone, tablet, or other computing device configured to access websites via the Internet. The computing device 110 may include (or may be connected to) one or more input devices (e.g., a keyboard, a mouse, a touchscreen, etc.) and one or more output devices (e.g., a monitor, a touchscreen, audio speakers, a headphone connection, etc.).

In particular aspects, the computing device 110, the server 120, the one or more other servers 124, and the one or more databases, data stores, and/or data storage devices 126 may include one or more processors or processing logic, memories, and/or network interfaces. The memories may include instructions executable by the processors to perform various functions as described herein. The network interfaces may include wired and/or wireless interfaces operable to enable communication to local area networks (LANs) and/or wide area networks (WANs), such as the Internet.

During operation, the user 102 may operate the computing device 110 to access a website 130, such as a graphic design website, via the server 120. The website 130 may enable the user to create and modify a design 140 using web application(s) and/or Software-as-a-service components presented by the website 130. In the example of FIG. 1, the website 130 includes an option 131 to search for images that can be added to the design 140, an option 132 to browse layouts that can be applied to the design 140, an option 133 to browse graphical elements (e.g., grids, frames, shapes, lines, icons, charts, etc.) that can be added to the design 140, an option 134 to browse text elements that can be added to the design 140, an option 135 to browse background colors and patterns that can be applied to the design 140, and an option 136 to browse content that the user 102 has previously uploaded.

The website 130 also includes a text field to enter a search query 137. In the illustrated example, the user 102 has entered "dog" into the text field, resulting in the display of various search results 138, i.e., images of dogs. Some of the search results 138 may have associated price information (e.g., "$1 USD"), indicating that the corresponding image can be used in a published design for a one-time use license fee. In the illustrated example, the user 102 has added one of the search results 138, namely a dog wearing a scarf, into the design 140, as shown at 141. The added search result was near the bottom of the search results, as indicated by a scroll position indicator 142. The website 130 may enable adjusting coloring of the image (as shown at 139), the size of the image (e.g., using one of four anchor points 143), and the rotational orientation of the image (e.g., using a rotation anchor point 144). The website may also enable horizontally or vertically flipping the image, as shown at 145. Although particular graphic design functionality is illustrated in FIG. 1, it is to be understood that the specific functionality shown is not to be considered limiting. In various aspects, the website 130 may enable at least any graphic design function that is generally found in a standalone graphic design application, although it is to be appreciated that the website 130 may enable other functionality as well.

Figure 9:
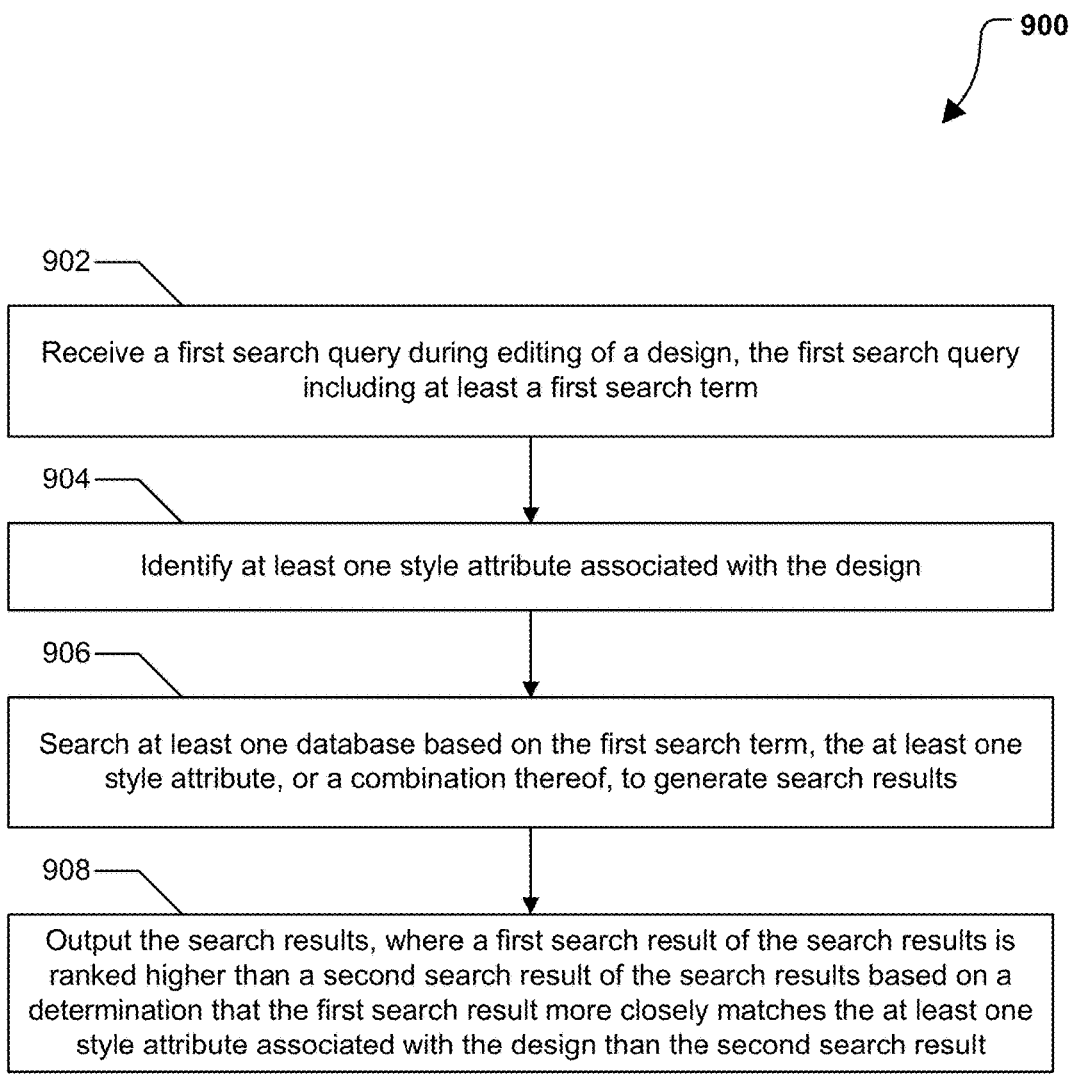
FIG. 9 illustrates another particular example of a method of matching style attributes of a design and style attributes of search results to identify search results of interest.

In a particular aspect, the website 130 enables automatic matching of style attributes, as further described with reference to FIGS. 2-5. For example, FIG. 2 illustrates the design 140 at the beginning of a graphic design process, i.e., the design 140 is blank. In an alternate example, the design 140 may not be blank at the beginning of the graphic design process (e.g., because the beginning of the graphic design process corresponds to opening a previously saved design for further editing). Each design created/edited via the website 130 may be associated with a style document that lists the various style attributes of the design 140. To illustrate, when the design 140 is empty, an associated style document 210 may list default design style attributes, such as "white background." The style document 210 may be automatically updated as the design 140 is updated. For example, the style document 210 may be updated when an item is added to the design, when an item is removed from the design, and when an item in the design is modified, as further described with reference to FIG. 9.

In some examples, the design 140 is stored as a digital file and the style document 210 is stored as part of the digital file (e.g., as metadata). In alternative examples, the style document 210 is stored and accessible separately from the design 140. It will be appreciated that the ability to access the style document 210 separately from the design 140 may enable fast searching of multiple style documents without having to load the associated design files (which may be much larger). In a particular aspect, the style document 210 is stored as extensible markup language (XML) data. In some examples, the style document 210 provides a structure to describe designs that combine rich text and graphics. The style document 210 may enable efficient representation of both semantic and stylistic content of a design. In an illustrative implementation, a style vector may be represented as an n-dimensional bit string that represents the stylistic and semantic content of a design. Style vectors may be deterministically computed from designs and may be used to compare the stylistic similarity between two designs, for example by calculating the "edit distance" between the two designs' corresponding style vectors. Thus, by representing style vectors as bit strings, the systems and methods of the present disclosure may enable faster style comparison searching for style-matched images. Moreover, because the style vector bit strings can be stored, retrieved, and processed separately from the corresponding design documents/files, an overall memory footprint involved in the style-based search process may be reduced.

Referring to FIG. 3, when the image of the dog wearing a scarf is added to the design, the style document 210 may be updated. For example, in addition to "white background," the style document 210 may include style attributes of the image, such as keywords, color, size, etc. In the illustrated example, the style document 210 includes "dog," "scarf," "standing," "white," "medium-gray," "black," "front-view," "eyes closed," "smile" and "2.44 inches width×4.30 inches height." In some examples, identifiers (IDs) of the images in the design may also be included in the style document. To illustrate, the image of the dog wearing the scarf may be part of a stock "scarf-wearing animals" library, and including an ID of the image in the style document 210 may lead to identifying additional images in the "scarf-wearing animals" library, for example because all of the images in the library have IDs starting with the same alphanumeric string. In some examples, the graphical element(s) of the design themselves may be style vectors. To illustrate, graphical elements may be input into an image-based or reverse image search, such as for color matching.

It is to be understood that the various examples of style attributes listed herein and shown in the drawings are for illustrative purposes only, and are not to be considered limiting. Additional examples of style attributes include, but are not limited to, number of colors, color palette, colors of lines, line thickness, number of lines, number of edges, absence/presence of a gradient, font style, ratio of transparent to solid pixels, absence/presence of solid (e.g., filled) objects vs. line/wireframe objects, use of vector vs. pixel/raster images, outlines, outline color, information regarding an author or contributor of an image, subjective information (e.g., image "mood"), etc.

The style attributes in the style document 210 may be dynamically updated if the user modifies the image of the dog. For example, if the user changes the color of the scarf to red, the style document 210 may include "red" instead of "medium-gray." It should be understood that although color information is represented using words in the illustrated example, in alternative examples colors may be represented using numbers (e.g., hexadecimal values #FFFFFF for white, #000000 for black, etc.). Geometric information may be represented in alternate units (e.g., pixels instead of inches) in some examples. In some implementations, the style attributes may include keywords that are not visually perceptible. For example, the style attributes for a picture of a sports car may include "fast." Examples of how to determine style attributes are further described herein.

Figure 4:
FIG. 4 illustrates a particular example presenting search results based on matching of style attributes.

Referring to FIG. 4, during editing of the design 140, the user 102 may search for another image to add to the design 140. For example, the user 102 may search for an image of a cat. In accordance with the present disclosure, the search results generated by such a search may automatically rank images that more closely match the style attribute(s) listed in the style document 210 higher than other images. For example, as shown in FIG. 4, images of standing cats wearing scarves may be automatically ranked higher than other images of cats. It will be appreciated that prioritizing search results that are "stylistically similar" to items already present in the design 140 may enable faster design processes and a more intuitive user experience, for example because a user may not have to scroll through a large number of search results to find a relevant image.

Thus, in particular aspects, the systems and methods of the present disclosure may compare style attributes of a design to style attributes of media assets (e.g., images) in a library or database. As described above, the style attributes for a design may be dynamically determined and stored in a style document as the design is modified. In some examples, the style attributes associated with the media assets in the library/database may be manually entered (e.g., by personnel associated with the graphic design website 130). In other examples, the style attributes associated with the media assets may be automatically determined. For example, style attributes may be automatically determined using computer vision algorithms. As another example, style attributes may be determined by neural network-based classifiers. For example, all or a portion of the media assets in the library/database may be used as a training set for a neural network, and the remainder of the media assets in the library/database, and newly uploaded media assets, may be automatically classified by the neural network.

According to a first example of operation at the system 100 of FIG. 1, a first search query input by the user 102 may be automatically augmented using all or a portion of a style document. To illustrate, a first search query "cat" entered by a user may be augmented based on the style document 210, resulting in a second (augmented) search query "cat; details=scarf, standing, eyes closed, smile; colors=white, medium gray, black; view=front-view; size=2.44×4.30," as shown in FIG. 5.

Searching available libraries/databases using the augmented search query, may provide search results that more closely match the general style of the design 140. For example, search results that match a greater number of terms in the augmented search query may be ranked higher than search results that match a fewer number of terms in the augmented search query. To illustrate, as shown in FIG. 5, the image of the cat wearing a scarf has eight style attributes that match the second search query, whereas the image of the boxing cat has three style attributes that match the second search query. Consequently, the image of the cat wearing a scarf may be determined to more closely match the style document 210 (and design 140) than the image of the boxing cat, and may therefore be ranked higher, as shown in FIG. 4.

In a particular example, because vector graphics may be available at the website 130, determining whether image "sizes" match may be equivalent to determining whether image aspect ratios are within a threshold range (e.g., 10%) of each other. For example, referring to FIG. 5, the second (augmented) search query includes a size of 2.44×4.30, which is equal to an aspect ratio of 2.44/4.30=0.57. The aspect ratios of the search results are 3.49/4.30=0.81 and 1.03/1.12=0.91, respectively. Because 0.81 and 0.91 are both outside of 0.57+/−10%, neither of the search results may match the image size specified by the search query.

According to a second example of operation at the system 100 of FIG. 1, the query may be augmented as described with reference to FIG. 5, but a hashing function may be used instead of performing an attribute-by-attribute comparison. For example, referring to FIG. 6, a first hash value H1 may be generated based on the style attributes associated with the first search result (the image of the cat wearing the scarf) and a second hash value H2 may be generated based on the style attributes associated with the second search result (the image of the boxing cat). A third hash value (H3) may be generated based on the style attribute(s) of the design, such as based on the second (augmented) search query. Each of the hash values H1, H2, and H3 may be numerical quantities that can be compared. In the illustrated example, the "distance" between H1 and H3 (e.g., the absolute value of the difference between H1 and H3) may be less than the distance between H2 and H3, indicating that the image of the cat wearing the scarf more closely matches the style of the design 140. Thus, the image of the cat wearing the scarf may be ranked higher than the image of the boxing cat, as shown in FIG. 4.

It is to be understood that style matching may not only be performed on a like-for-like basis. In some examples, certain style vectors may be stylistically matchable to other items, such as backgrounds. To illustrate, if a user has only applied a black background to a design, a search may identify results that are complementary to the black background. To illustrate, images that are white or yellow and would contrast with the black background and may therefore be ranked higher than images having a color that would be hard to see against the black background, such as navy blue.

FIGS. 5-6 thus illustrate examples of operation in which a search query provided by a user is automatically augmented based on style attributes associated with a design. In other examples, the search query may not be augmented. Instead, search results may be retrieved based on the user-provided query, and the style attributes associated with the design may subsequently be used to rank the search results, where such ranking is based on attribute-by-attribute matching as described with reference to FIG. 5 or hashing as described with reference to FIG. 6.

Figure 7:
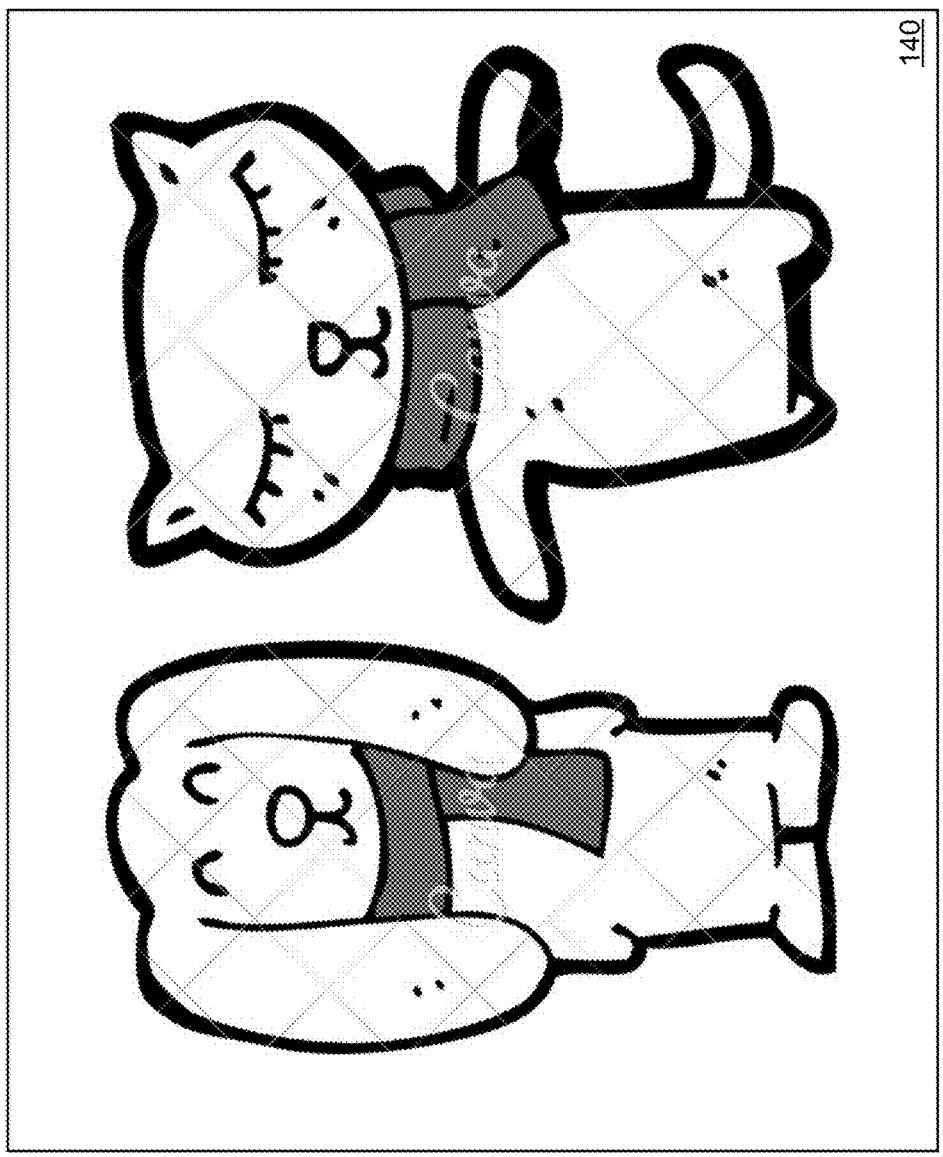
FIG. 7 illustrates a third particular example of style attributes associated with a design.

Continuing to FIG. 7, the user 102 has added the image of the cat wearing the scarf to the design 140. As a result, the style document 210 now includes the style attributes of the image of the scarf-wearing dog (as in FIG. 3), and also includes the style attributes associated with the image of the scarf-wearing cat. If the user 102 were to perform another search, say, for a bird, style attributes of both images in the design 140 may be used to identify images of birds that are stylistically similar to the design (e.g., wearing a scarf).

FIGS. 1-7 thus illustrate various aspects of matching style attributes during a graphic design process. Matching of style attributes, such as in generating and/or prioritizing search results, may enable faster design processes and provide a more intuitive user experience. For example, time spent scrolling through search results to find images of interest may be reduced.

In some aspects, machine learning may be used in the system 100. As a first example, stylistic features a user likes, uses, hovers on, clicks, publishes, etc. may be tracked and may be elevated in subsequent suggestions or search results. For example, if a user searches for a dog and has a history of utilizing monochrome line drawings, then monochrome line drawings of dogs may be prioritized in the search results. In some examples, during a registration or onboarding process, users may be asked to choose which illustrations are their favorite out of a set. The style vectors of the chosen illustrations may be stored as user style preferences and may be used when ranking search results. In a particular example, style vectors of images that a user has already added into an in-progress or previously published design may be more heavily weighted so that they more significantly sway the style of future suggestions or search results.

As another example of machine learning techniques used in the system 100, regression models may be trained based on user actions and may be used to predict what categories (e.g., "birthday," "wildlife," etc.) of designs (and by extension, what images) a user may be likely to use in the near future. As another example, a machine learning algorithm may adjust weights used to rank search results. As yet another example, neural networks may be used to perform image clustering based on content or style, and for users whose preferences are similar to a particular cluster, images of that particular cluster may be ranked higher in search results. As another example, natural language processing may be used to modify (e.g., extend) search queries by using search terms that are likely to generate better search results than initial search terms provided by a user.

Although various descriptions herein reference determining stylistically similar media, in some examples stylistically "complementary" media may also or alternatively be determined. To illustrate, fonts or images that are complementary to those already present in an in-progress design may be ranked higher in search results. Complementary fonts may be fonts that have been determined to be aesthetically pleasing and/or often used together. Such fonts may have some style attributes that are similar (e.g., letter thickness) and other style attributes that differ (e.g., use of serifs). Similarly, complementary images may have some style attributes that are similar and other style attributes that are different.

In some examples, probability weighting may be used during searches. For example, it may be determined that designs that are too stylistically homogenous are bland or otherwise aesthetically displeasing. Thus, a search result that is "too visually similar" to what is already present in a design (e.g., as determined using a computer vision algorithm) may receive a negative weighting and may be deprioritized in search results. Various factors or weightings may contribute to a "probability of success metric" for a search result, and the probability of success metric may be iteratively refined using machine learning techniques described above. As an illustrative non-limiting example, if a user inserts an image of a dog into a design and then searches for cats, then, as described above, images of cats that are stylistically similar to the image of the dog may be ranked higher in the search results. However, if a certain highly ranked search result is repeatedly unused, then a negative weighting may start to accrue for that cat image's probability of success metric in relation to that dog image. Conversely, if a certain search result is repeatedly used, then a further positive weighting may start to accrue for that cat image's probability of success metric in relation to that dog image. Such probability of success metrics may be implemented and stored on a per-user basis or on a global basis.

In some examples, text that has been added to a design may be used as part of the search process. To illustrate, a user may add "Happy Birthday" to a design and then perform an image search with the search query "child." In response, the search query may be augmented to "child happy birthday," but images that are found based solely on the augmentation may be weighted less than the images that resulted from the primary keyword "child." Nonetheless, the search results may be enhanced as compared to searching using only the primary keyword "child," because images of children celebrating their birthday may be prioritized.

Figure 8:
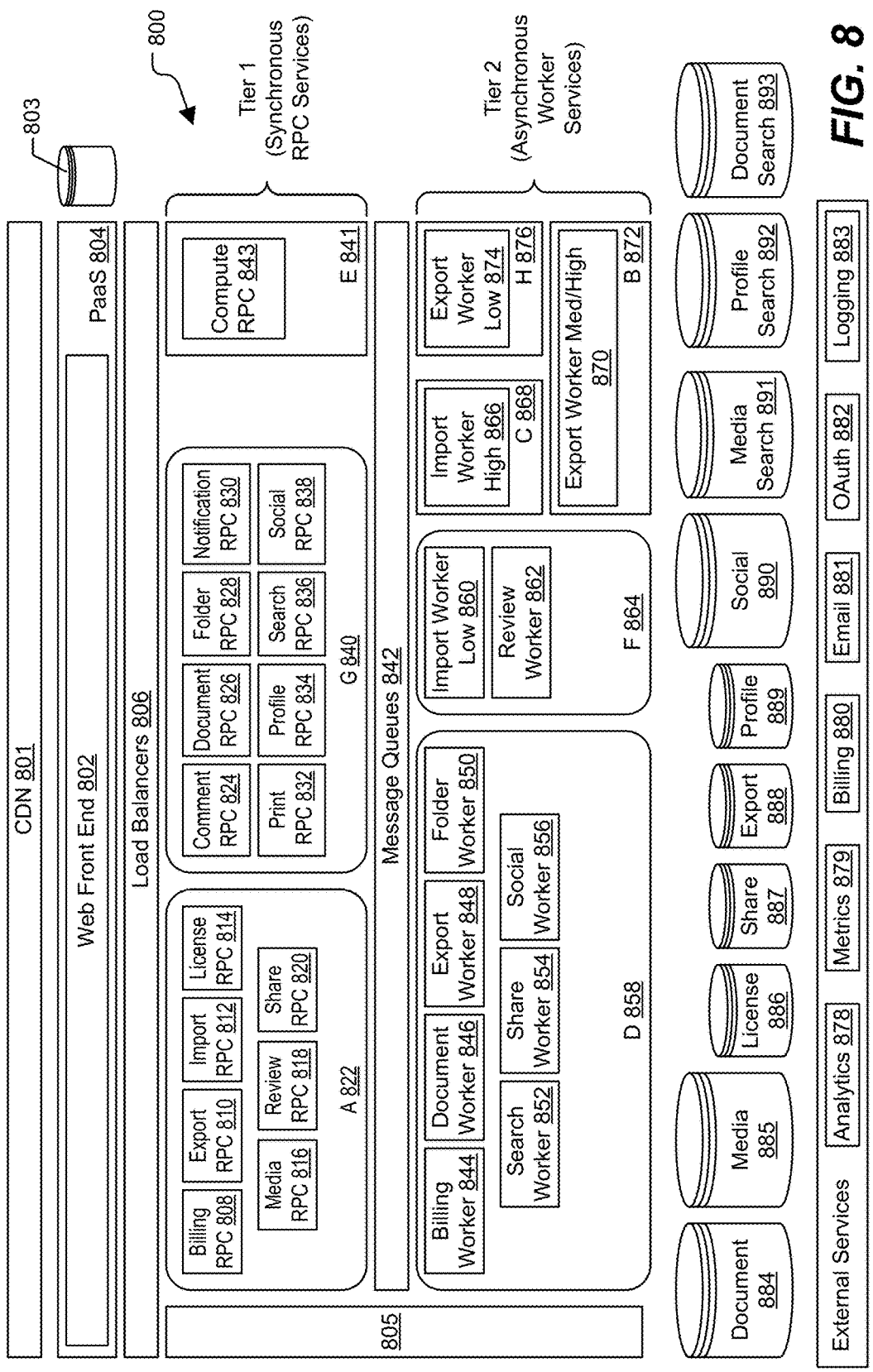
FIG. 8 illustrates another particular example of a system that is operable to match style attributes of a design and style attributes of search results to identify search results of interest.

Whereas FIG. 1 illustrates a system 100 that is operable to perform style attribute matching at a high level, it is to be understood that operation of such a system may include various local and/or cloud-based components that are not illustrated in FIG. 1. For example, FIG. 8 depicts, in greater detail, a logical diagram of a system 800 operable to support embodiments of the present disclosure. Although illustrated in a logical diagram, it is to be understood that the various components of the system 800 may include or may correspond to computer hardware, computer software, or a combination thereof. Moreover, components of the system 800 may be configured to communicate with each other, for example via wired network(s) and/or wireless network(s). Thus, in various implementations, operations described herein as being performed by a particular component of FIG. 8 may be performed by dedicated hardware, software, or a combination thereof corresponding to the particular component.

In particular aspects, the system 800 supports browser-based and mobile application-based access to a graphic design website. To illustrate, the graphic design website may correspond to the website 130 of FIG. 1, and some or all of the components in the system 800 may be implemented by the server 120, the server(s) 124, and/or the device(s) 126 of FIG. 1. For example, users may log in to the website and create, edit, and save graphic designs. The website may support operations including, but not limited to, creating a new design, applying a layout to a design, searching for and adding images to a design, saving a design, publishing a design, etc. In particular aspects, the graphic design website supports automatic matching of style attributes, as described with reference to the preceding figures.

The system 800 includes a web front end 802 executed at a platform as a service (PaaS) provider 804. The PaaS provider 804 may enable at-scale deployment of software as a service (SaaS) applications, such as web applications. For example, the web front end 802 may represent one, five, ten, or some other number of instances of a SaaS application that executes on hardware owned by and/or leased from the PaaS provider 804. Each such instance of the front end SaaS application may be accessible via the Internet. In some examples, a browser or a mobile application executed by a user's computing device may access the web front end 802 via a content delivery network 801. The CDN 801 may also be configured to cache static content (e.g., thumbnails, static images, static web content, etc.). To illustrate, when a user requests a particular content item, such as a particular image, if the CDN 801 (e.g., a server thereof) stores a copy the image, the CDN may respond to the request without passing the request further into the service infrastructure shown in FIG. 8. The CDN 801 may thus include multiple geographically distributed "edge" servers that cache content.

The web front end 802 may be configured to serve a website to requestors, such as by responding to hypertext transfer protocol (HTTP) GET requests, HTTP POST requests, etc. The web front end 802 may also be configured to respond to application programming interface (API) calls originating from web browsers and/or mobile apps. In some examples, the web front end 802 may utilize an in-memory cache 803 that stores session data. To illustrate, when a user logs in to the website served by the web front end 802, information regarding the user (e.g., display name, photo, subscription level, e-mail address, etc.) may be stored in the in-memory cache 803 for rapid retrieval, processing, and/or rendering on some or all of the webpages of the website. Use of the in-memory cache 803 may thus enable quickly serving webpages without accessing backend systems to determine user information.

The system 800 includes load balancers 806 configured to support communication and workload distribution from the web front end 802 to a plurality of backend services or microservices that execute, for example, on one or more virtual machines in a cloud computing environment. Each such virtual machine may be implemented using physical hardware that is owned by and/or leased by a cloud service provider. The system 800 may support scaled, dynamic deployment of services based on scale groupings in a multi-tiered configuration. In particular aspects, services may be grouped in certain virtual machines based on expected load patterns for the services. The architecture of the system 800 may enable the reorganization of these groupings with low effort, based on changes in observed load patterns or the introduction of new services. Separating services across multiple virtual machines may also enable scaling specific service groups in response to increases in certain kinds of loads. This scaling may occur automatically based on monitoring of load, and may also be triggered manually in anticipation of load increases. To illustrate, if an increasing number of search tasks are observed (e.g., based on percentage of busy vs. idle time), more virtual machines that include instances of the search RPC service 836 and/or the search worker 852 may dynamically be instantiated to service the demand. Conversely, if an administrator of the system 800 anticipates search volume to increase, the administrator may manually initialize additional virtual machines that include instances of the search RPC service 836 and/or the search worker 852. When search volume decreases, the virtual machines may be automatically (e.g., based on percentage of busy vs. idle time) or manually scaled down.

In the example of FIG. 8, a first tier of services includes synchronous "request-response" remote procedure call (RPC) services and a second tier includes asynchronous "worker" services. A synchronous RPC service may receive first data from a requestor, perform one or more processing functions, and return second data to the requestor. Such synchronous request-response services may be used for tasks that can be completed relatively quickly, e.g., in three seconds or less, because in some examples a requestor (e.g., a web browser or mobile app) may block while waiting for a response. Conversely, the asynchronous worker services of the second tier may be used for background tasks and other tasks that cannot or may not be completed relatively quickly.

In FIG. 8, the first tier includes a first scale group 822 (designated "A"), a second scale group 840 (designated "G"), and a third scale group 841 (designated "E"). The first scale group 822 includes a billing remote procedure call (RPC) service 808, an export RPC service 810, an import RPC service 812, a license RPC service 814, a media RPC service 816, a review RPC service 818, and a share RPC service 820. To illustrate, a virtual machine corresponding to the first scale group 822 may execute the illustrated RPC services. The billing RPC service 808 may be configured to perform synchronous billing tasks (e.g., checking account balance). The export RPC service 810 may be used to perform synchronous graphic design export tasks (e.g., saving a design to a relatively simple output image format). The import RPC service 812 may be configured to enable user importing of media assets for use in graphic design creation/editing. The license RPC service 814 may be configured to enforce image licenses (e.g., one-time-use licenses). The media RPC service 816 may be configured to track and catalog media assets available via the system 800, including but not limited to user-uploaded and/or library images, layouts, fonts, etc. The review RPC service 818 may be configured to facilitate acceptance of contributor media (e.g., uploading of media assets by authorized contributors of the website). The share RPC service 820 may enable sharing of graphic designs with other users, such as via social media accounts.

The second scale group 840 includes a comment RPC service 824, a document RPC service 826, a folder RPC service 828, a notification RPC service 830, a print RPC service 832, a profile RPC service 834, a search RPC service 836, and a social RPC service 838. The comment RPC service 824 may enable users to comment on graphic designs in comment threads. The document RPC service 826 may enable the core design creation, design updating, and design deletion functionality of the website. The folder RPC service 828 may enable navigating into and out of different folders associated with a user's account. The notification RPC service 830 may enable generating and serving notifications to users via the website (e.g., when a user's design is "liked" or commented on). In some aspects, multiple such notifications may be coalesced into an e-mail that is sent to an e-mail address of the user or that is shown on a pop-up when the user accesses the website. The print RPC service 832 may enable sending a graphic design to a third-party printer, for example to be printed and then delivered to a physical mailing address of the user. The profile RPC service 834 may enable users to manage their website account. The search RPC service 836 may enable searching for images, layouts, designs, etc. The social RPC service 838 may enable users to perform social networking engagement on the website (e.g., "follow" another user, "like" another user's design, etc.) and may generate "feeds" of designs created by followed users. The third scale group 841 includes a compute RPC service 843 that may be dedicated for performing certain fast high-CPU-utilization operations, such as hashing and solving of passwords.

The second tier of services in FIG. 8 includes a fourth scale group 858 (designated "D"), a fifth scale group 864 (designated "F"), a sixth scale group 868 (designated "C"), a seventh scale group 876 (designated "H"), and an eighth scale group 872 (designated "B"). The fourth scale group 858 includes a billing worker 844, a document worker 846, an export worker 848, a folder worker 850, a search worker 852, a share worker 854, and a social worker 856. The fifth scale group 864 includes a low priority import worker 860 and a review worker 862. The sixth scale group 868 includes a high priority import worker 866. The seventh scale group 876 includes a low priority export worker 874. The eighth scale group 872 includes a medium/high priority export worker 870. In illustrative aspects, the asynchronous worker services in FIG. 8 may perform longer and/or more complex versions of the operations performed by the corresponding RPC services of FIG. 8. In a particular implementation, the priority designations shown in FIG. 8 (e.g., "low," "medium," and "high") correspond to an amount of dedicated processing resources. "High" priority may be used for jobs that are triggered by user actions whereas "medium" or "low" priority may be used for jobs that are not triggered by user actions (e.g., background jobs).

It is to be understood that the various services and groupings thereof shown in FIG. 8 is for illustration only and is not to be considered limiting. In alternative embodiments, more, fewer, and/or different services may be present in the system. Moreover, a different grouping of services into different scale groups than shown in FIG. 8 may be used. In some aspects, each of the scale groups shown in FIG. 8 corresponds to a virtual hardware instance, i.e., a virtual machine running at a cloud services provider. Thus, at any given time, there may be one or more active/executing instances of each of the scale groups, and the specific numbers of active/executing virtual machine instances may dynamically change based on the overall workload being managed by the load balancers 806. Coordination and configuration of the various instances, including communication between instances and/or services executed therein, may be managed by a coordination tool 805, which may itself be a cloud-based system.

During operation, the synchronous RPC services of the first tier may be configured to communicate with the asynchronous workers' services of the second tier via message queues 842 and may utilize the asynchronous workers to perform time-consuming tasks. For example, the export RPC service 810 may receive a request that a user wants to export a graphical design to a portable document format (PDF). The export RPC service 810 may push a corresponding work request into the message queues 842. An export worker (e.g., the medium/high priority export worker 870) may respond to the work request by rendering the graphical design to PDF. The PDF or (a link to the PDF stored in a cloud storage system) may then be passed back to the requesting user. As another example, the folder RPC service 828 may receive a request indicating that a user wants to share a folder of graphic designs with another user. The folder RPC service 828 may use the message queues 842 to request that the folder worker 850 set the corresponding permissions on the folder and on each of the items in that folder. As yet another example, asynchronous workers may be used to perform routine background tasks in the system 800, such as daily verification of subscription levels.

During certain operations at the system 800, the illustrated services may access one or more databases or data stores. For example, a document database 884 may store files corresponding to user-created graphic designs and a media database 885 may store image uploads, fonts, and layouts that are accessible via the graphic design website. In an illustrative aspect, the document database 884 may be accessed by the document worker 846 when a user opens or saves a graphic design. In another illustrative aspect, the media database 885 may be accessed by the media RPC service 816 when a user uploads or retrieves an image, a layout, or a font.

The system 800 may also include one or more of a license database 886, a share database 887, an export database 888, a profile database 889, or a social database 890. The license database 886 may be used by the license RPC service 814 to track licenses (e.g., one-time-use licenses for images) that have been acquired by a user. The share database 887 may be used by the share RPC service 820 or the share worker 854 to manage sharing of graphic designs with other users (e.g., via social network(s)). The export database 888 may be used by the export RPC service 810, the export worker 848, the low priority export worker 874, or the medium/high priority export worker 870 to track user exports of their graphic designs into different output formats. The profile database 889 may support searching for user profiles based on different criteria. The social database 890 may support social media aspects of the website.

The system 800 may also include databases or data stores that support search functionality. For example, a media search database 891 may be accessed by the search RPC service 836 or the search worker 852 when a user searches for images, layouts, or fonts. As another example, a profile search database 892 may be accessed by the profile RPC service 834 when a user edits the profile information associated with their account. As yet another example, a document search database 893 may be accessed by the document worker 846 when a user searches for a previously saved graphic design.

Certain operations at the system 800 may involve accessing "external" services that are not part of the core service oriented platform of the website. Examples of such external services may include, but are not limited to, an analytics service 878, a metrics service 879, a billing service 880, an e-mail service 881, an open authorization (OAuth) service 882, or a logging service 883. The analytics service 878 may receive analytics events (e.g., messages) each time a user performs an action on the website, and may enable per-user and macro level analytics of website workflow, operations, and performance. The metrics service 879 may collect and provide performance information regarding the various components of the system 800. The billing service 880 may interface to one or more external payment providers, such as for credit card processing, mobile payment processing, etc. The e-mail service 881 may enable generating and/or sending e-mails to users (e.g., for notifications, password reset, etc.). The OAuth service 882 may enable federated logins to the website using social network credentials. The logging service 883 may index events/messages that are generated by the components of the system 800 for later diagnostic searching.

One example of an operation that may be supported by the system 800 is logging in to the graphic design website via an Internet browser or a mobile app. A login request may be received by the web front end 802 from the Internet browser or mobile app. The login request may be routed by the load balancers 806 to an instance of the profile RPC service 834, which may "look up" the user in the profile database 889 and may authenticate the user (federated social networking login may involve the OAuth service 882). Once the user is authenticated, the website may load a custom homepage for the user, which may include operations being performed by an instance of the folder RPC service 828, the document worker 846, etc. The custom homepage may then be returned to the user's Internet browser or mobile app.

Another example of an operation that may be supported by the system 800 is starting a new design or opening an existing design. When a user clicks on a new design template, the web front end 802 may provide the user's Internet browser or mobile application a graphical design interface (e.g., HTML code) that is executable to edit the new or existing design. In the case of loading an existing design, the document RPC service 826 and/or the document worker 846 may access the document database 884 to retrieve the existing design, and the media RPC service 816 may load media assets that are included in the design from the media database 885.

Another example of an operation that may be supported by the system 800 is when a user updates a design using the graphical design interface served by the website. As the user updates the design, the updates may be processed by the document RPC service 826 and/or the document worker 846. For example, the service(s) may process image or text movement, insertion, deletion, resizing, recoloring, etc.

Another example of an operation that may be supported by the system 800 is when a user imports an image. In this case, the import RPC service 812 and/or one of the import workers 860, 866 may receive a user-uploaded image, process the image, and integrate the image into the media database 885 for subsequent retrieval by the media RPC service 816.

Another example of an operation that may be supported by the system 800 is when a user applies a layout to a design. In this case, the media search database 891 may provide via the media RPC service 816, media assets corresponding to the layout. The insertion of the media assets into the design may then be processed by the document RPC service 826 and/or the document worker 846 as an update to the user's design.

Another example of an operation that may be supported by the system 800 is when a user searches for a media asset and then drags-and-drops the media asset into a design. For example, when a user enters a search query "dog," the search RPC service 836 and/or the search worker 852 may access the media search database 891 to retrieve search results for "dog." The search results may be presented by the user's Internet browser or mobile app. When the user adds a particular search result, e.g., a particular image of a dog, to their design, the document RPC service 826 or the document worker 846 may process the corresponding update to the design.

In a particular aspect, the system 800 may support matching of style attributes. As a design (e.g., the design 140) is being updated, the document RPC service 826 and/or the document worker 846 may generate a style document (e.g., the style document 210) that describes style attributes that are in use in the design. The style document may be a part of the design or may be stored separately from the design. The style document may then be used to "boost" search results that are returned by a search. For example, all or a portion of the style document can be appended to a search query entered by the user.

To support such augmented searching, the media in the media database 885 may be indexed on style attributes. The indexing may be done manually and/or automatically using computer vision-based and/or machine learning (e.g., neural network classifier-based) algorithms and may result in metadata that is stored along with the media assets. In a particular aspect, an asynchronous indexing service is executed to perform such indexing functions. When the user enters a search query, the method 900 of FIG. 9 may be performed to generate search results.

The method 900 includes receiving a first search query during editing of a design, the first search query including at least a first search term, at 902. For example, referring to FIG. 8, the web front end 802 and/or CDN 801 may serve a graphic design website (e.g., the website 130 of FIG. 1) to a user device (e.g., the computing device 110 of FIG. 1). While the user edits a design (e.g., the design 140) on the website, the document RPC service 826 may save the edits to the design and may update a style document (e.g., the style document 210) associated with the design. During the editing process, the user may enter a first search query, which may be received by the search RPC service 836 and/or the search worker 852. In an illustrative example, the first search query may include a first search term "cat," as shown in FIGS. 4-6.

The method 900 also includes identifying at least one style attribute associated with the design, at 904. For example, referring to FIG. 8, the document RPC service 826 may determine the style attributes associated with the design from the style document associated with the design, and may provide the style attributes to the search RPC service 836 and/or the search worker 852.

The method 900 further includes searching at least one database based on the first search term, the at least one style attribute, or a combination thereof, to generate search results, at 906. For example, referring to FIG. 8, the search RPC service 836 and/or the search worker 852 may search the media search database 891 based on the first search term, the at least one style attribute, or both. In an illustrative implementation, the search RPC service 836 and/or the search worker 852 may generate a second search query by augmenting the first search query with style attribute(s), as described with reference to FIGS. 5-6, and may search the media search database 891 based on the second search query. Alternatively, the media search database 891 may be searched using the first search query.

The method 900 includes outputting the search results, at 908. A first search result of the search results is ranked higher than a second search result of the search results based on a determination that the first search result more closely matches the at least one style attribute associated with the design than the second search result. For example, the search RPC service 836 and/or the search worker 852 may provide the search results, via the web front end 802 and/or the CDN 801, to the computing device 110 of FIG. 1 for display. As shown in FIG. 4, when the design includes an image of a dog wearing a scarf, images of cats wearing a scarf may be ranked higher than other images of cats in the search results. In an illustrative implementation, the search RPC service 836 and/or the search worker 852 may perform an attribute-by-attribute comparison between style attributes of the search results and style attributes of the design, as shown in FIG. 5. Alternatively, the search RPC service 836 and/or the search worker 852 may evaluate hashing functions to determine how closely the style attributes of a search result match the style attributes of the design, as shown in FIG. 6.

Methods and devices that may implement embodiment(s) of the various features of the present disclosure have been described with reference to the drawings. The drawings and the associated descriptions are provided to illustrate embodiments and not to limit the scope of the present disclosure. Reference to any specific aspect, embodiment, or implementation is intended to indicate that a particular feature, structure, or characteristic described in connection therewith is included in at least an aspect, embodiment, or implementation of the present disclosure. However, the various uses of the terms "aspect," "embodiment," or "implementation" are not necessarily all referring to the same single aspect, embodiment, or implementation.

In the foregoing description, specific details are given to provide a thorough understanding of the present disclosure. However, it will be understood by one of ordinary skill in the art that the present disclosure can be practiced without these specific details. Well-known structures and techniques may not be shown in detail, in order to avoid obscuring the illustrated embodiments. For example, algorithms may be shown in block diagrams.

It is noted that embodiments may be described as a process that is depicted as a flowchart, a flow diagram, a structure diagram, or a block diagram. Although a flowchart may describe operations as a sequential process, many of the operations can be performed in parallel or at least partially concurrently. In addition, the order of the operations can be rearranged. A process is terminated when its operations are completed. A process can correspond to a method, a function, a procedure, a subroutine, a subprogram, etc. When a process corresponds to a function, its termination corresponds to a return of the function to the calling function or the main function.

Moreover, storage may represent one or more devices that store data, including but not limited to random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), a flash memory device, and/or other computer-readable or processor-readable media to store information. As used herein, a computer-readable or processor-readable storage medium/device is not a signal.

Furthermore, embodiments can be implemented by hardware, software, firmware, middleware, microcode, or any combination thereof. When implemented in software, firmware, middleware or microcode, program code or code segments to perform the tasks can be stored in a memory or other storage. One or more than one processor can perform tasks in series, distributed, concurrently, or in parallel. In some examples, a virtual computer system can be constructed to implement one or more of the methods or functionality as described herein. A code segment can represent a procedure, a function, a subprogram, a program, a routine, a subroutine, a module, a software package, a class, or a combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted through a suitable means including memory sharing, message passing, token passing, network transmission, etc.

Although the present disclosure has been described with a degree of particularity, it is understood that the present disclosure has been made by way of example and that other versions are possible. As various changes could be made in the above description without departing from the scope of the disclosure, it is intended that all matter contained in the above description or shown in the accompanying drawings shall be illustrative and not used in a limiting sense.

All features disclosed in the specification, including the claims, abstract, and drawings, and all the steps in any method or process disclosed, can be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise.

Thus, unless expressly stated otherwise, each feature disclosed is one example only of a generic series of equivalent or similar features. The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing description.

What is claimed is:

1. A method comprising:

identifying, at a processor of a computing device, at least one style attribute associated with a first image in a design;

receiving, at the processor, a first search query for a second image during editing of the design, the first search query including at least a first search term, wherein the first search query is received subsequent to identifying the at least one style attribute;

generating, by the processor, a second search query for the second image by adding to the first search query at least one term that is based on the at least one style attribute;

searching at least one database based on the second search query instead of the first search query to generate search results, wherein a first search result of the search results is ranked higher than a second search result of the search results based on a determination that the first search result more closely matches the at least one style attribute associated with the first image than the second search result, and wherein determining that the first search result more closely matches the at least one style attribute associated with the first image than the second search result comprises:
generating a first hash value of one or more style attributes associated with the first search result;
generating a second hash value of one or more style attributes associated with the second search result;
generating a third hash value of the at least one style attribute associated with the first image; and
determining that a first distance between the first hash value and the third hash value is less than a second distance between the second hash value and the third hash value; and
outputting the search results, each search result indicating a respective image.

2. The method of claim 1, wherein the at least one style attribute associated with the first image indicates a color, a number of colors, a color palette, a line color, a line thickness, a number of lines, a number of edges, an outline, an outline color, a presence or absence of a gradient, a size, a font, a font style, a ratio of transparent to solid pixels, a presence or absence of vector or raster images, a presence or absence of solid or line objects, an aspect ratio, a view, a keyword, a mood, information regarding an author or contributor of an image, or any combination thereof.

3. The method of claim 1, wherein the at least one style attribute associated with the first image includes a keyword indicating an attribute that is associated with the design and that is not visually perceptible.

4. The method of claim 1, wherein the at least one style attribute associated with the first image is identified based on a style document associated with the design, and wherein the style document is stored and accessible separately from the design.

5. The method of claim 1, further comprising updating a style document responsive to editing of the design, wherein the at least one style attribute associated with the first image is identified based on the style document.

6. The method of claim 1, wherein generating the search results includes performing a single search of the at least one database.

7. The method of claim 1, further comprising ranking the search results based on whether a style attribute of each of the search results matches the at least one style attribute associated with the first image.

8. The method of claim 1, wherein at least one of the search results is associated with a style attribute that is entered via user input.

9. The method of claim 1, wherein at least one of the search results is associated with a style attribute that is automatically determined based on one or more computer vision processes, a neural network-based classifier, a machine learning algorithm, or a combination thereof.

10. The method of claim 1, wherein a plurality of style attributes is associated with the design, wherein a first number of style attributes associated with the first search result match the plurality of style attributes, wherein a second number of style attributes associated with the second search result match the plurality of style attributes, and wherein the first number is greater than the second number.

11. An apparatus comprising:
at least one processor;
a memory storing instructions executable by the processor to perform operations comprising:
identifying at least one style attribute associated with a first image in a design;
receiving a first search query for a second image during editing of the design, the first search query including at least a first search term, wherein the first search query is received subsequent to identifying the at least one style attribute associated with the first image;
generating, by the processor, a second search query for the second image by adding to the first search query at least one term that is based on the at least one style attribute associated with the first image;
searching at least one database based on the second search query instead of the first search query to generate search results, wherein a first search result of the search results is ranked higher than a second search result of the search results based on a determination that the first search result more closely matches the at least one style attribute associated with the first image than the second search result, and wherein determining that the first search result more closely matches the at least one style attribute associated with the first image than the second search result comprises:
generating a first hash value of one or more style attributes associated with the first search result;
generating a second hash value of one or more style attributes associated with the second search result;
generating a third hash value of the at least one style attribute associated with the first image; and
determining that a first distance between the first hash value and the third hash value is less than a second distance between the second hash value and the third hash value; and
outputting the search results, each search result indicating a respective image.

12. The apparatus of claim 11, further comprising at least one data storage device configured to store the design.

13. The apparatus of claim 12, wherein the at least one data storage device is further configured to store a style document associated with the design, wherein the style document identifies the at least one style attribute associated with the first image, and wherein the style document is accessible separately from the design.

14. The apparatus of claim 11, further comprising at least one network interface configured to receive the first search query from a computing device and to output the search results to the computing device.

15. The apparatus of claim 11, wherein a plurality of style attributes is associated with the design, wherein a first number of style attributes associated with the first search result match the plurality of style attributes, wherein a second number of style attributes associated with the second search result match the plurality of style attributes, and wherein the first number is greater than the second number.

16. A processor-readable storage device storing instructions that, when executed, cause a processor to perform operations comprising:
identifying at least one style attribute associated with a first image in a design;
receiving a first search query for a second image during editing of the design, the first search query including at least a first search term, wherein the first search query is received subsequent to identifying the at least one style attribute associated with the first image;
generating, by the processor, a second search query for the second image by adding to the first search query at least one term that is based on the at least one style attribute associated with the first image;

searching at least one database based on the second search query instead of the first search query to generate search results, wherein a first search result of the search results is ranked higher than a second search result of the search results based on a determination that the first search result more closely matches the at least one style attribute associated with the first image than the second search result, and wherein determining that the first search result more closely matches the at least one style attribute associated with the first image than the second search result comprises:

generating a first hash value of one or more style attributes associated with the first search result;

generating a second hash value of one or more style attributes associated with the second search result;

generating a third hash value of the at least one style attribute associated with the first image; and determining that a first distance between the first hash value and the third hash value is less than a second distance between the second hash value and the third hash value; and outputting the search results, each search result indicating a respective image.

17. The processor-readable storage device of claim 16, wherein the at least one style attribute associated with the first image is identified based on a style document associated with the design, and wherein the operations further comprise updating the style document responsive to editing of the design.

18. The processor-readable storage device of claim 16, wherein a third search result of the search results is ranked higher than the second search result of the search results based on a determination that the third search result has a style attribute that is complementary to the at least one style attribute associated with the first image.

* * * * *